June 24, 1930. W. W. GRAHAM 1,767,446
HOT AIR CONTROL FOR WINDSHIELDS AND CAR INTERIORS
Filed May 13, 1929
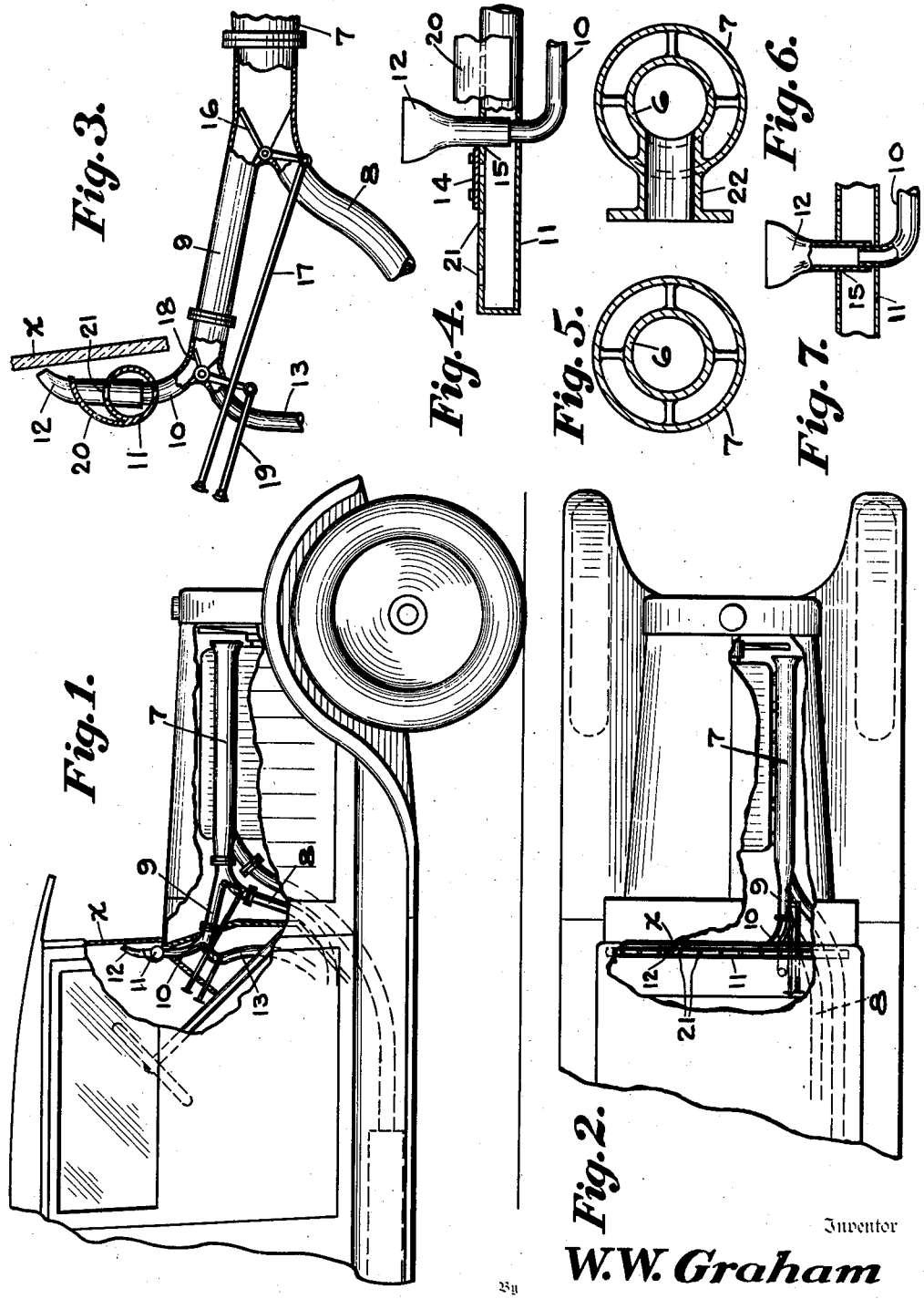
Inventor
W. W. Graham
By
Hiram A. Sturges Attorney Patented June 24, 1930

1,767,446

UNITED STATES PATENT OFFICE

WILLIAM W. GRAHAM, OF FREMONT, NEBRASKA

HOT-AIR CONTROL FOR WINDSHIELDS AND CAR INTERIORS

Application filed May 13, 1929. Serial No. 362,823.

This invention relates to a hot-air control for windshields and car-interiors, and has for its object, broadly, to provide means for controlling the heat derived from the exhaust manifold of a car, during cold weather, and directing it to the glass of the windshield for preventing the formation of frost or vapor thereon, and for directing heat to the interior of the car.

The invention includes a sleeve, preferably constructed integral with the exhaust manifold, and includes convenient means for directing the heat.

With the foregoing objects in view and others to be mentioned, the invention presents a new and useful construction, combination and arrangement of parts as described herein and claimed, and as illustrated in the accompanying drawing, it being understood that changes may be made in form, size, proportion of parts and minor details, said changes being within the scope of the invention as claimed.

In the drawing Fig. 1 is a broken away side view showing the front part of a car with the device mounted thereon. Fig. 2 is a plan view of the parts shown in Fig. 1. Fig. 3 is an enlarged, broken away detail relating to Figs. 1 and 2, parts being in section. Fig. 4 shows a side view of a conducting-pipe and its nozzle and a part of a horizontal, perforated distributing pipe, the latter being partly in section. Fig. 5 is a transverse section through the exhaust manifold and sleeve. Fig. 6 is a view similar to that shown in Fig. 5, an intake being shown in communication with the exhaust manifold. Fig. 7 is a sectional detail relating to Fig. 4.

Referring now to the drawing for a more particular description, the invention is shown and described in connection with the exhaust manifold 6 of an internal combustion engine. Numeral 7 indicates a sleeve which is preferably constructed integral with the manifold. Numeral 8 indicates a waste pipe normally in communication with the sleeve 7, said waste pipe extending rearwardly of the vehicle to permit the escape of heat to the atmosphere. Numeral 9 indicates a conduit normally in communication with the sleeve 7 and extending rearwardly therefrom. Numeral 10 indicates a conducting-pipe normally in communication with the conduit 9. At 11 is indicated a horizontal, perforated distributing-pipe disposed at the side of the windshield or glass $x$ of the windshield and adapted to be in communication with the conducting-pipe 10. Numeral 12 indicates a nozzle-member removably mounted on the end of the conducting-pipe 10 with its lower end extending through the upper wall of the distributing-pipe 11.

Numeral 13 indicates a second conducting-pipe normally in communication with the conduit 9, this last named conducting pipe extending rearwardly into the interior of the car for heating purposes.

As thus described air may enter the sleeve 7 at its front end and may become heated on account of its exposure to the exhaust manifold, and the heated air may pass rearwardly through the waste pipe 8 and conduit 9 and may enter the conducting-pipe 10 and second conducting-pipe 13 subject to the control of devices to be described. Numeral 14 indicates a slide or closure-member which is provided for the distributing-pipe 11, and it will be understood that the nozzle 12 may be removed from the pipe 10 and from the distributing-pipe 11, and after the nozzle has been removed the slide 14 may be moved and may cover the aperture 15 which is formed in the upper side of the pipe 11 to prevent the escape of hot air through said aperture, and it will be understood that the outer end of the pipe 10 terminates in the distributing-pipe 11, and hot air moving through the conducting-pipe 10 will be discharged to the distributing-pipe 11.

Numeral 16 indicates a damper which is arranged to have a swinging movement in the sleeves 7 by use of a rod 17 and it will be understood that when the damper is moved in one direction it may make a closure of the waste pipe 8 so that heated air will move through the conduit 9, and when moved in a reversed direction it will make a closure of the conduit so that heated air will move through the waste pipe 8.

Numeral 18 indicates a second damper which is mounted to permit swinging movements in the conduit 9, and by use of a rod 19 the damper may be moved in one direction to make a closure of the second conducting-pipe 13 to permit heated air to move into the first named conducting-pipe 10.

As thus described it will be appreciated that accumulations of frost or vapor on the glass of a windshield may be effectively prevented, this being a very useful feature, since the frost in severe cold weather might obstruct the view of a driver of an automobile. In the extreme cold weather the nozzle 12 is placed in position and is mounted upon the outer end of the conducting-pipe 10 while inserted in the aperture 15 of the distributing-pipe 11, as best shown in Fig. 4 of the drawing, and in operation the heated air will be discharged upon the glass.

In instances during cold weather, and when the weather is somewhat mild, the nozzle is not used, and since the distributing-pipe 11 is perforated and has a length corresponding approximately to that of the windshield, the heat will be uniformly distributed and will prevent the formation of vapor on the glass.

The use of the nozzle mentioned has been found to be of great advantage during extreme cold weather since it causes the glass to be effectively heated in front of the driver. Numeral 20 indicates a flange or curved deflector tending to cause a movement of heated air towards the glass *x* from the distributing-pipe 11.

While I have shown a sleeve 7 which completely surrounds the exhaust manifold 6, I do not wish to limit myself to this feature since it is obvious that the sleeve would be operative if mounted at one side of the manifold. Also, while I have shown perforations 21 of the distributing-pipe 11, I do not wish to be limited to this feature since it is obvious that an apertured distributing-pipe would be operative, the function discharged by the perforations being simply to permit the heated air to be discharged uniformly from said pipe. Numeral 22 indicates the usual intake for burned hydrocarbon to the exhaust manifold.

During warm weather it will be understood that the front end of the sleeve may be closed and the damper in the sleeve may be adjusted for closing the inner end of the conduit 9, and heated air from the sleeve will be prevented from moving through the conducting-pipes 10 and 13 into the car.

Since the open front end of the sleeve is disposed adjacent to the fan (not shown) usually employed, air will be forcibly moved rearwardly through the sleeve and will be directed to the windshield and interior of the car in a heated condition for the purposes mentioned.

I claim as my invention—

1. In a heating means for the windshield of a car, a sleeve stationary with the car and arranged to be heated, a waste pipe normally communicating with the sleeve, an apertured distributing-pipe disposed adjacent to the windshield, a conducting-pipe normally in communication with the distributing-pipe and sleeve, means for terminating the communication of the waste pipe with the sleeve, and an upwardly projecting nozzle-member adapted to be removably mounted on the conducting-pipe for a communication therewith to terminate the communication of the last named pipe with the distributing-pipe.

2. In heating means for the glass of the windshield and interior of a car, a sleeve arranged to be heated and disposed in the car stationary therewith, a waste pipe normally in communication with the sleeve, a perforated distributing-pipe at the side of the windshield, a conducting-pipe normally in communication with the sleeve and distributing-pipe, a damper arranged to be moved for terminating the communication of the waste pipe with the sleeve, and a nozzle adapted to be disposed at the side of the windshield in communication with the conducting-pipe terminating the communication of said conducting-pipe with the perforated distributing-pipe.

3. A heating device for the windshields of motor cars, a distributing pipe disposed within and crosswise of the windshield at the lower portion thereof and having numerous perforations in the upper part directed toward the windshield, said distributing pipe also having a slot therein, a slide for moving into and out of registry with said slot, a conducting-pipe entering said distributing pipe opposite the slot and in communication with a source of heated fluid supply, and a nozzle adapted to be fitted through said slot and onto said distributing pipe when the slide is out of registry with the slot.

4. A device for the heating of windshields of motor cars comprising a perforated distributing pipe disposed transversely of the windshield at the lower portion thereof, a curved deflector disposed to direct the heated product from the pipe out through the perforations and against the windshield, a conducting pipe projecting into the lower portion of the distributing pipe, and a nozzle adapted to be removably fitted through said distributing pipe and onto said conducting pipe.

In testimony whereof, I have affixed my signature.

WILLIAM W. GRAHAM.